UNITED STATES PATENT OFFICE.

FRANK H. MERRILL, OF LOS ANGELES, CALIFORNIA.

PROCESS OF PURIFYING SODIUM CARBONATE AND THE LIKE.

1,419,463.                Specification of Letters Patent.    Patented June 13, 1922.

No Drawing.        Application filed April 30, 1921.   Serial No. 465,702.

*To all whom it may concern:*

Be it known that I, FRANK H. MERRILL, a citizen of the United States, residing in Los Angeles, in the county of Los Angeles, in the State of California, have invented new and useful Improvements in Processes of Purifying Sodium Carbonate and the like, of which the following is a specification.

This invention relates generally to processes for the removal of carbon or carbonaceous matters, or other oxidizable matters from inorganic matters, such as inorganic salts. The objects and accomplishments of the invention can be best described and understood by a description of the process as applied to carbonate compounds of sodium, such as sodium carbonate or sodium bi-carbonate, or mixture of the two in the substance known as urao; and so, the following description and specification will deal with the specific application of the process to such substances as those, however, without it being intended that the process be limited in its broader aspects to such salts; although in its more specific aspects the process is particularly adaptable to the removal of such oxidizable matters from those specific salts.

In the processes of manufacture of sodium carbonate and sodium bicarbonate from natural saline waters, there is usually present in the final product a small percentage of carbon or carbonaceous matters that gives the final product a grayish appearance; whereas the pure product is clear and white in appearance. Difficulty has been experienced in removing such carbonaceous matters. They can of course be removed by heating the whole mass up to oxidizing temperature in the atmosphere; but this involves the heating of the carbonates to their fusion point; and which fused mass must subsequently be again broken up or treated or retreated in some process to produce the finely divided product which is desirable as a commercial product. Further than that, the heating of the mass to the fusion point, or above the fusion point, requires an excessive amount of fuel and usually produces an objectionable percentage of caustic soda, whose presence in the carbonates is very objectionable; the trades requiring carbonates free from caustic soda.

Furthermore, and particularly as applied to the purification of sodium carbonate, there are further difficulties involved. One of the most desirable commercial forms of sodium carbonate is what is known as "light soda ash." This is produced by special processes, being a product of low specific gravity, finely divided. Heating this light soda ash for the purpose of purification to, or approximately to the fusing point, immediately converts it into what is known as "dense ash" or "heavy ash."

It is the object of this invention, for instance as applied specifically to sodium carbonates, to provide a process of purification—a process of removing the carbonaceous and other oxidizable matters—without heating the mass to the fusion point of the carbonates. My invention accomplishes this object and produces a purified carbonate, without changing its physical form. And in general, my process accomplishes the oxidation of carbonaceous matter or other oxidizable matter at a temperature lower than is necessary to accomplish such oxidization by roasting in the presence of air; and the process may be applied generally to inorganic matters where it is desirable to oxidize such impurities without raising the mass to the high temperature necessary for air roasting.

In the specific application of my process to sodium carbonate, or sodium bicarbonate, or to the mixture of the two which usually occurs as urao, and which usually contains a small percentage of carbonaceous impurities, a small percentage of sodium nitrate is first intimately mixed with the inorganic salt or salts. The amount of nitrate of course depends upon the amount of impurities present; but in the average case of such carbonates produced from natural alkali waters an amount of nitrate equal to say one-quarter of one per cent is usually sufficient to oxidize the small amount of impurities present; but to make up for any possible unevenness of intimate mixing, I add about twice that amount, viz—about one-half of one per cent of sodium nitrate. The amount used may of course vary to suit the amount of impurities present.

The whole mass is then heated to a temperature high enough to cause oxidation of carbonaceous matters by reaction with the sodium nitrate, but not to a temperature high enough to fuse the mass.

I have found that fairly low temperatures may be used for this purpose; and so far I have found that the process operates at any temperature from about 300° up to approximately the point of fusion of the carbonates. Of course it is desirable to carry on the process at as low a temperature as is practicable, as thermal efficiency is thereby gained, and also because there is at lower temperatures less chance than there is at higher temperatures of locally over-heating any portion of the mass to a point above the fusion temperature. (The fusion temperature of carbonate of sodium is about 1500° F.) The process will operate at temperatures less than 300° F.; I simply state that temperature as a suitable low one.

By the reaction of oxidation the nitrate of soda is converted into carbonate of soda. If sodium carbonate or urao is being purified, then of course it is readily seen that the nitrate is converted into the same substance as one of the constituents of the mass. In the process now used for manufacturing sodium carbonate from saline waters, where the final carbonate is produced from an intermediate bicarbonate by heating, the purification process here described may be carried on simultaneously with this transformation step; the nitrate being mixed with the bicarbonate and then heated both for purposes of purification and transformation. In any case my process attains purification reaction at a much lower temperature than obtains with air oxidation. A much lower fuel consumption and much greater economy is the result.

Having described a preferred form of my invention, I claim:

1. The process of removing carbonaceous matter from carbonate compounds of sodium, embodying heating the sodium compound in the presence of sodium nitrate.

2. The process of removing carbonaceous matter from carbonate compounds of sodium, embodying heating the sodium compound in the presence of sodium nitrate at a temperature of approximately 300° F. or more.

3. The process of removing carbonaceous matter from carbonate compounds of sodium, embodying heating the sodium compound in the presence of sodium nitrate, whereby the carbonaceous matters are oxidized by the nitrate and a portion of the nitrate changes to carbonate.

4. The process of removing carbonaceous matter from carbonate compounds of sodium, embodying first intimately mixing sodium nitrate with the sodium carbonate compound, then heating the mixture to a temperature of approximately 300° F. or more, whereby the carbonaceous matters are oxidized by the nitrate and a portion of the nitrate changes to carbonate.

5. The process of removing carbonaceous matter from compounds of sodium, embodying heating the sodium compound in the presence of a deoxidizable sodium compound to a temperature of approximately 300° F. or more, the two substances being in dry state.

6. The process of removing carbonaceous matter from carbonate compounds of sodium, embodying heating the sodium carbonate to a temperature approximately above 300° F. and below its fusing temperature in the presence of a deoxidizable sodium compound whose deoxidation occurs at a temperature below the fusing temperature of the carbonate the two substances being in dry state.

7. The process of removing carbonaceous matter from compounds of sodium, embodying heating the sodium compound in the presence of a deoxidizable sodium compound, the two substances being mixed together in dry state.

In witness that I claim the foregoing I have hereunto subscribed my name this 24th day of April, 1921.

FRANK H. MERRILL.

Witness:
VIRGINIA BERINGER.